Figure 1:
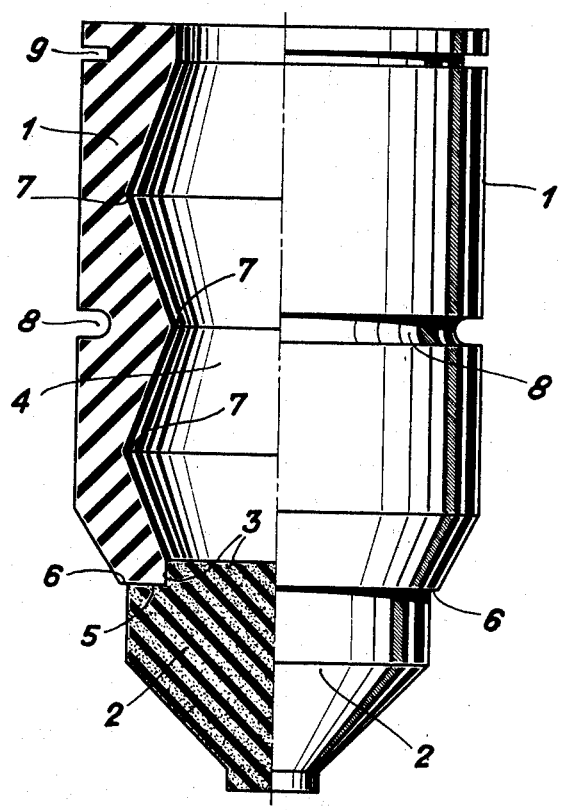

Aug. 11, 1964

R. E. SZONN ETAL 3,144,247

RESILIENT ELEMENT CONSISTING OF RUBBER
OR RUBBER-ELASTIC SYNTHETIC RESIN

Filed June 14, 1961

2 Sheets-Sheet 1

Inventors
Reinhold Szonn
Gottfried Reuter

By

Watson Cole Grindle & Watson
ATTYS.

United States Patent Office 3,144,247
Patented Aug. 11, 1964

3,144,247
RESILIENT ELEMENT CONSISTING OF RUBBER OR RUBBER-ELASTIC SYNTHETIC RESIN
Reinhold Ehrenfried Szonn, Kreis Grafsch. Diepholz, and Franz Gottfried Reuter, Lemforde, Hannover, Germany, assignors to Firma Lemforder Metallwarengesellschaft m.b.H., Lemforde, Hannover, Germany
Filed June 14, 1961, Ser. No. 117,145
Claims priority, application Germany June 23, 1960
1 Claim. (Cl. 267—63)

In suspension systems, more particularly vehicle suspension systems, a spring characteristic which begin very flat and without any bounce due to contact and then gradually terminates in a steep and progressively rising line is aimed at. A characteristic having advantages of this kind is obtained in ideal manner in pneumatic springs owing to the adiabatic compression of the volume of the air. These pneumatic suspensions, however are very expensive to manufacture and costly, so that they cannot be used, for example, in small vehicles, the cost of production of which may only be very low.

The problem set by the present invention is to adapt the spring characteristic of resilient elements consisting of rubber or rubber-elastic synthetic resin and which are cheap to manufacture largely to those of pneumatic springs so as to make it possible to utilise the advantages offered by pneumatic springs by means of a spring which is substantially simpler and cheaper to produce.

According to the invention, the solution of the problem posed consists in that a resilient element consisting of rubber or rubber-elastic synthetic resin is composed of a harder homogeneous elastic part for absorbing the high compressive forces and a softer cellular elastic part for absorbing the low initial forces. The homogeneous elastic part is advantageously annular or pot-shaped and closed by a cellular elastic buffer part covering the opening of the hollow space. By this means, the effect obtained is that at the beginning of the stroke of the resilient element of the soft cellular structure, which is preferably made of foamed polyurethane, results in a spring characteristic following a flat course and which, the more the cellular elastic part is compressed, becomes more and more steep and progressive until the subsequent deformation of the homogeneous elastic part constitutes the steepest zone of the spring characteristic for the absorption of the compressive forces. Owing to the design according to the invention of the resilient element, it is possible to obtain a characteristic which is assimilated to the ideal characteristic obtained in pneumatic springs by the adiabatic compression of the volume of the air.

According to a further feature of the invention, it is possible, in addition, to fill the hollow space of the resilient element with a gas, air or the like and also, to this end, to cover the inside or outside of the wall with a thin, air-tight skin.

In addition, according to another feature of the invention, the homogeneous elastic part of the element may be provided wih pre-arranged bend points or kinks so as to prevent any laterally displaced bending action on compression and thereby ensure stable behaviour during the resilient action.

A course of the spring characteristic which is as flat as desired can be adjusted by the shaping of the cellular elastic part which is required to absorb the initial forces, so that, for example, with a ball-end shape, it is possible, to obtain a characteristic which begins flat but rapidly becomes steeper, while with a conical shape the characteristic, which begins flat, rises only gradually and hence another characteristic can be obtained. Thus, while retaining homogeneous elastic annular parts of a design which remains uniform, it is possible to employ, as required, a conical, spherical, flat or differently shaped cellular elastic part.

Of course, it is also possible, to connect a plurality of rubber-elastic resilient elements in series as a whole in order to obtain a large springing course. The result obtained by the alternating sequence of homogeneous and cellular material is that the deformation of the homogeneous elastic part occurs only after a shortening of the total length of the resilient element by previous compression of the cellular elastic parts, so that, here too, extremely stable behaviour is ensured. This is very important in particular in the case of full springing movements which do not permit exactly parallel compression.

The connection of the homogeneous elastic part to the cellular elastic part can be effected by cementing, filling in the joints, vulcanising on or the like.

For the purpose of attaching the resilient element, said element is advantageously provided with a sheet-metal cap at one end. However, it is also possible, to provide the resilient element with sheet-metal caps at both ends and secure it to said caps so as also to enable tensile forces to be intercepted during the return springing action.

The fact that, at higher frequencies the hysteresis increases, and thereby also the damping, commends the use of particularly bulky cellular elastic parts, whereby, when said resilient elements are employed, for example, in small vehicles, it is possible to dispense with fitting shock absorbers in addition.

In addition to rubber, it is also possible to employ polyurethane or another elastomer as rubber-elastic material. Formed polyurethane is preferably employed for the cellular elastic part.

A number of embodiments of the invention are illustrated in the drawing.

According to FIGURE 1, the circular member 1 consisting of homogeneous elastic material is provided at its lower end with a cellular elastic buffer part 2 having a short fitting cylindrical plug or extension 3 extending into the hollow space 4 of said circular member 1. The buffer part 2 is applied by means of a shoulder surface 5 against a countersurface 6 of the circular member 1. The two parts 1 and 2 are cemented to one another at their surfaces of contact.

The homogeneous elastic circular member 1 is provided with pre-arranged bend points or kinks 7 which are formed after the fashion of a bellows on the inside of the wall and are assisted in their action by an annular groove 8 on the outside. In this case, the cellular elastic buffer part 2 has a conical form in order to obtain a resilient action which commences particularly softly. During the resilient action, the part 2 is compressed and then arches inwardly into the hollow space 4 until the deformation of the homogeneous elastic part 1 commences. Said circular part bends in uniformly all round at the prearranged bend points and in so doing falls into folds as the inward bending action increases, whereby a particularly favourable progressive rise in the spring characteristic is obtained.

The circular member 1 is provided at its upper edge with an annular groove 9 in which a sheet-metal cap supporting the entire resilient element is secured (not illustrated here).

Figure 2:
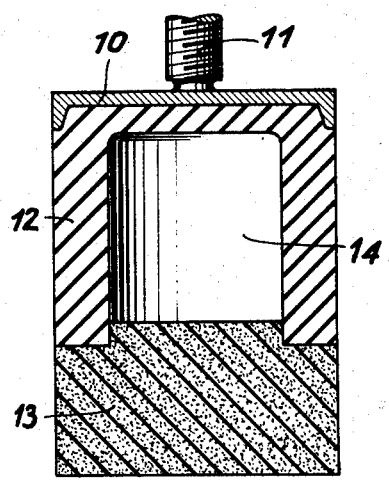

FIGURE 2 shows a resilient element in which the homogeneous elastic part 12 is pot-shaped and whose cellular elastic part 13 closing the hollow space 14 has a flattened shape at its bottom surface. The sheet-metal cap supporting the resilient element is designated by the reference 10 and carries a threaded pin 11 in the center for fixing in any desired manner.

Figure 3:
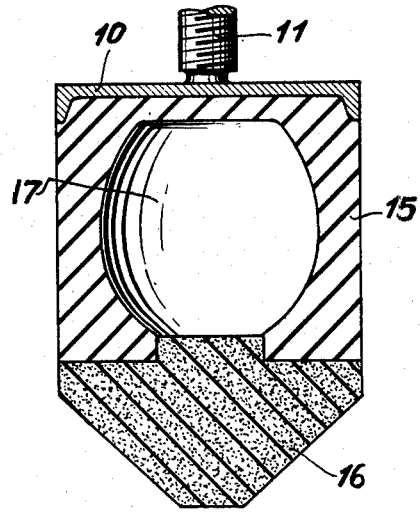

According to the embodiment shown in FIGURE 3, the homogenous elastic part 15 is bellied out on the inside 4 of its wall, so that a smaller wall thickness is obtained at the central diameter and permits easier bulging out of the wall 17 on compression. The spring characteristic of this resilient element should have a considerably flatter course than FIG. 2, especially as the buffer part 16 has a conical shape as in the case of FIGURE 1.

Figure 4:
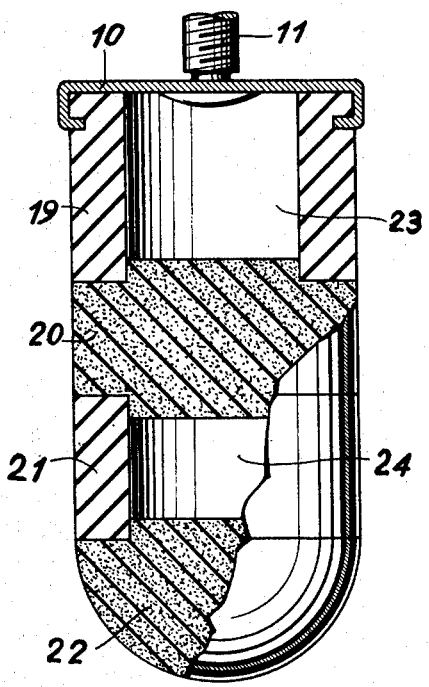

FIGURE 4 shows two resilient elements 19 and 21 connected in series, each of which has alternately a homogeneous elastic 19, 21 and a cellular elastic part 20, 22, the lower homogeneous elastic part 22 having a hemispherical shape in this embodiment. This combined construction with the hollow portions 27 and 30 in parts 26 and 32 respectively, is particularly simple to produce, since it consists of simple parts, as in FIG. 2. Connection of the resilient elements in series is effected in order to obtain as large a springing course as possible.

Figure 5:
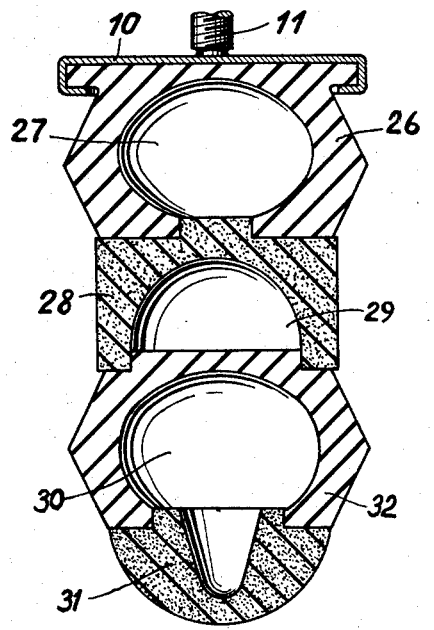

FIGURE 5 shows another construction of a combination spring. According to this embodiment, the cellular elastic buffer members 28 and 30 are also formed as hollow bodies 26 and 32 in order to obtain in this case a particularly soft characteristic with the parts 29 and 31.

What we claim is:

Resilient element particularly for vehicle suspension systems comprising a resilient member composed of a hard homogeneous elastic tubular member which is hollow to absorb high compressive forces closed at one end and open at the other end and a soft cellular elastic part closing the other end of the tubular member and defining therewith a pressure chamber and connected to said homogeneous elastic member to absorb the low initial forces, the cellular elastic part having a short plug portion extending and fitting into the hollow space of the homogeneous elastic part and is secured by means of a shoulder surface in front of a counter surface on the homogeneous elastic part.

References Cited in the file of this patent

UNITED STATES PATENTS

| | | |
|---|---|---|
| 43,316 | Lewis | June 28, 1864 |
| 475,693 | Macphail | May 24, 1892 |
| 2,037,033 | Lord | Apr. 14, 1936 |
| 2,088,566 | Avery | Aug. 3, 1937 |
| 2,154,586 | Stern | Apr. 18, 1939 |
| 2,729,441 | Henss | Jan. 3, 1956 |
| 2,832,087 | McEuan | Apr. 29, 1958 |
| 2,890,904 | Materi | June 19, 1959 |
| 2,969,656 | Rueter | Jan. 31, 1961 |
| 3,037,764 | Paulson | June 5, 1962 |

FOREIGN PATENTS

| | | |
|---|---|---|
| 727,324 | France | Mar. 22, 1937 |
| 662,622 | Germany | June 23, 1938 |
| 974,702 | Germany | Apr. 6, 1961 |
| 4,073 | Great Britain | of 1888 |
| 755,186 | Great Britain | Aug. 15, 1956 |
| 541,719 | Italy | Apr. 17, 1956 |

OTHER REFERENCES

"Composite Springing," April 1958 issue of Automobile Engineer (pp. 154–158).